United States Patent Office 3,503,991
Patented Mar. 31, 1970

3,503,991
SYNTHESIS OF PARA-DITHIANES
Wolfgang T. Eisfeld, Troisdorf, Germany, and Edward D. Weil, Yonkers, N.Y., assignors to Stauffer Chemical Company, New York, N.Y., a corporation of Delaware
No Drawing. Filed Nov. 14, 1966, Ser. No. 593,642
Int. Cl. C07d 73/00
U.S. Cl. 260—327                  8 Claims

ABSTRACT OF THE DISCLOSURE

Process for the simultaneous preparation of dithianes of the formula:

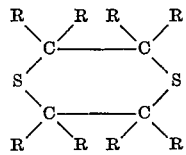

and tertiary alkyl halides of the formula:

wherein R is hydrogen or alkyl containing from about 1–8 carbon atoms, $R_1$ is lower alkyl, X is halogen and all R's and $R_1$'s may be the same or different; by heating a corresponding tertiary-alkyl 2-haloalkyl sulfide to a temperature of from about 150° C. to about 300° C. in the presence of a catalyst such as alumina, silica, an alumina-silica, clay or phosphoric acid. It is preferred to conduct this reaction in the vapor phase.

---

The present invention relates to the simultaneous synthesis of para-dithianes and tertiary alkyl halides through the catalytic cleavage of tertiary-alkyl 2-haloalkyl sulfides.

The para-dithianes have found various utilities as pesticides and pesticide intermediates and as oil additives. The tertiary alkyl halides are valuable intermediates for the preparation of tertiary alcohols and tertiary alkylphenols which are, in turn, important antioxidants for oils, plastics and foodstuffs. Additionally, both of these compounds can also be used as precursors in the preparation of a wide variety of organic compounds. Until the present time, the para-dithianes have been prepared through the reaction of the highly irritating and toxic bis-beta-chloroalkyl sulfides (the sulfur mustards) and sodium sulfide or from the relatively expensive alkylene episulfides. The process of the present invention provides excellent yields of both para-dithiane and also tertiary alkyl halides. The prior art methods produced alkali metal halides such as sodium chloride which are not usually worth the cost of recovery.

In accordance with the present invention para-dithianes are produced through the reaction of tert-alkyl 2-haloalkyl sulfide at temperatures of from about 150° C. to about 300° C. in the presence of a suitable catalyst. The dithianes which can be produced in accordance with the present invention include those having the formula:

FORMULA I

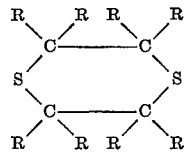

wherein R is either a hydrogen or an alkyl group containing from about 1 to about 8 carbon atoms, inclusive.

Illustrative of such alkyl groups as are represented by R are methyl, ethyl, propyl, butyl, pentyl, hexyl, heptyl, octyl, cyclohexyl and the like. It should be further noted that the R groups as represented in Formula I above can be the same or different for each occurrence of the group R.

The tertiary-alkyl 2-haloalkyl sulfides which are used to prepare the corresponding dithianes include those having the formula:

FORMULA II

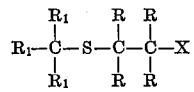

wherein R has the definition as given above, $R_1$ (which may be the same or different) is an alkyl radical containing from 1 to 6 carbon atoms, inclusive, and X is a halogen atom such as fluorine, chlorine, bromine and iodine. Because reaction rates are superior and the products obtained more valuable, it is preferred to utilize tertiary-alkyl 2-haloalkyl sulfides wherein $R_1$ is methyl in each occurrence, forming a tertiary butyl group and at least one R substituent to the carbon adjacent to the sulfur atom is hydrogen and wherein X is a halogen having a molecular weight in excess of 30, most preferably being chlorine.

Suitable catalysts for use in the present invention are acidic solids which include alumina, silica, alumina-silica, clay, or phosphoric acid supported on silica gel. The catalyst used to cleave the tert-alkyl haloalkyl sulfide is generally used in a catalytic amount. The use of the catalyst in a vapor-phase reaction is usually conducted in the form of a bed which the material passes over and is catalyzed thereby. When the reaction is conducted in this method, it is desirable that retention over the catalyst be from about one second to about five minutes.

The present process is generally conducted at a temperature of from about 150° C. to about 300° C. and most desirably at a temperature of about 180° C. to about 280° C. These temperatures are dictated by the findings that the rate of reaction is inconveniently slow at lower temperatures and higher temperatures cause the formation of undesirable by-product which becomes a serious problem.

While the present reaction can be conducted in the liquid phase, it has been found most desirable to conduct it in the vapor phase by heating the reactant to a temperature sufficient to volatilize it and passing this volatilized compound over a catalyst bed, or feeding the liquid reactant onto the catalyst bed and allowing it and the products to vaporize thereon.

The tertiary-alkyl 2-haloalkyl sulfides can be readily prepared in excellent yields through the action of ultraviolet light or free radical induced addition of a tertiary-alkyl mercaptan to a substituted or unsubstituted vinyl halide, following the reaction diagram indicated below:

REACTION DIAGRAM I

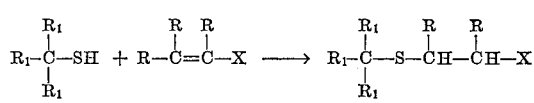

wherein R, $R_1$ and X have been previously defined. Another method by which these reactants can be prepared is through the addition of tert-alkanesulfenyl halides to olefins to obtain the same type of intermediate sulfides.

The examples which follow serve to illustrate the invention. In these examples and throughout the specification all parts and percentages are by weight unless otherwise specified.

EXAMPLE 1

Into a flask containing 10 grams of granular activated alumina catalyst at 235° C.–245° C. was fed 20 ml. of tert-butyl 2-chloroethyl sulfide (prepared in the known manner by photo-catalyzed addition of tert-butyl mercaptan to vinyl chloride). After a reaction time of about one minute, the catalyst was purged with nitrogen and the effluent gas stream was passed first through a condenser at 25° and then through a cold trap chilled with Dry Ice and acetone. In the condenser there was collected 6 grams of colorless crystalline product which was established to be p-dithiane by infrared comparison to an authentic sample, and melting point (112° C.). The cold trap collected 5 grams of liquid which melted at −28° C. and which was found to be tert-butyl chloride by infrared comparison to an authentic sample.

EXAMPLE 2

A catalyst was prepared by adding 10.5 grams of concentrated phosphoric acid to 19 grams of silica gel and heating to 200° C. for 3 hours. Passage of tert-butyl 2-chloroethyl sulfide (5 grams/hour) over this catalyst at 230° C.–240° C. at a retention time of 10–50 seconds yielded substantially equimolar amounts of p-dithiane and tert-butyl chloride.

EXAMPLE 3

Passage of tert-butyl 2-chloroethyl sulfide over granular synthetic alumina-silica catalyst at 260° and a contact time of 20 seconds affords a substantially complete conversion to p-dithiane and tert-butyl chloride.

In a similar fashion, the following sulfides are converted to the indicated dithianes and tert-alkyl sulfides at 220–250° over granular alumina catalyst.

| Example | Sulfide fed | p-Dithiane obtained | Alkyl chloride obtained |
| --- | --- | --- | --- |
| 4 | Tert-butyl 2-chloropropyl sulfide. | Dimethyl-p-dithiane. | Tert-butyl chloride. |
| 5 | Tert-amyl 2-chloropropyl sulfide. | ___do___ | Tert-amyl chloride. |
| 6 | Tert-octyl 2-chlorobutyl sulfide. | Diethyl-p-dithiane. | Tert-octyl chloride. |

What is claimed is:

1. The process for the simultaneous production of para-dithianes and tertiary-alkyl halides through the condensation reaction of a tertiary-alkyl 2-haloalkyl sulfide having the formula:

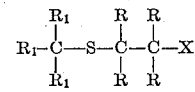

wherein R is hydrogen or lower alkyl and $R_1$ is lower alkyl and X is a halogen in the presence of a catalytic quantity of an acidic catalyst selected from the group consisting of alumina, silica, an alumina-silica, clay, or phosphoric acid, at a temperature of from about 150° C. to about 300° C.

2. The process of claim 1 wherein the tertiary-alkyl 2-haloalkyl sulfide is tert-butyl 2-chloroethyl sulfide.

3. The process of claim 1 wherein the reaction is conducted at a temperature of from about 180° C. to about 280° C.

4. The process of claim 1 wherein the acidic catalyst used is activated alumina.

5. The process of claim 1 wherein the acidic catalyst used is phosphoric acid.

6. The process of claim 1 wherein the acidic catalyst used is an alumina-silica catalyst.

7. The process of claim 1 wherein the reaction is conducted in the vapor phase by passing the vaporized tertiary alkyl 2-haloalkyl sulfide over an acidic catalyst selected from the group consisting of alumina, silica, an alumina-silica, clay, or phosphoric acid under such conditions that the sulfide reactant is provided with a retention time over the catalyst of from 1 second to 5 minutes, inclusive.

8. The process of claim 1 wherein the tertiary alkyl 2-haloalkyl sulfide is a tertiary alkyl 2-chloroalkyl sulfide.

References Cited

UNITED STATES PATENTS 2,662,086   12/1953   Hughes et al. _____ 260—327

JAMES A. PATTEN, Primary Examiner

U.S. Cl. X.R.

260—658, 609